(12) United States Patent
Yachin et al.

(10) Patent No.: US 10,607,208 B1
(45) Date of Patent: *Mar. 31, 2020

(54) SYSTEM AND METHOD FOR MANAGEMENT AND AUTOMATION OF INSTANT PURCHASE TRANSACTIONS

(71) Applicant: SLYCE CANADA INC., New Waterford (CA)

(72) Inventors: Avital Yachin, Bet Lehem Haglilit (IL); Andrey Petrenko, Hadera (IL)

(73) Assignee: SLYCE CANADA INC., New Waterford (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,403

(22) Filed: Jun. 3, 2019

Related U.S. Application Data (63) Continuation of application No. 15/076,259, filed on Mar. 21, 2016.

(60) Provisional application No. 62/136,172, filed on Mar. 20, 2015, provisional application No. 62/136,205, filed on Mar. 20, 2015.

(51) Int. Cl.
| | |
|---|---|
| *G06Q 30/00* | (2012.01) |
| *G06Q 20/32* | (2012.01) |
| *G06Q 20/40* | (2012.01) |
| *G06Q 30/06* | (2012.01) |
| *G06Q 20/10* | (2012.01) |

(52) U.S. Cl.
CPC ....... *G06Q 20/3221* (2013.01); *G06Q 20/102* (2013.01); *G06Q 20/401* (2013.01); *G06Q 30/0601* (2013.01)

(58) Field of Classification Search
CPC ................................................ G06Q 30/06–08
USPC ................................................ 705/26.1–27.2
See application file for complete search history.

(56) References Cited

U.S. PATENT DOCUMENTS

| | | | |
|---|---|---|---|
| 2002/0052806 A1* | 5/2002 | Hodson | G06Q 30/06 705/26.8 |
| 2013/0132236 A1* | 5/2013 | Gokturk | G06Q 30/0625 705/26.61 |

* cited by examiner

*Primary Examiner* — Ethan D Civan
(74) *Attorney, Agent, or Firm* — Pillsbury Winthrop Shaw Pittman, LLP (57) ABSTRACT

A system and related method for completing online transactions via mobile device includes a client-side e-commerce platform executing on the mobile device that identifies candidate items for purchase based on images related to an item desired by the user. Purchase information for items offered by participating vendors is retrieved by the platform via APIs of the vendor network. Purchase information for items offered by third-party vendors outside the network is retrieved by a middleware platform called by the client-side platform. The user may select items for purchase and complete the transaction via single click, whereby the middleware forwards payment details to the third-party vendors and retrieves pricing, inventory, and purchase information (as well as authorization codes and records of the completed transaction) from the third-party vendors. The client-side platform generates a single transaction and invoice whether the selected items are purchased from in-network or third-party vendors.

30 Claims, 5 Drawing Sheets

212 — Generating, via the first e-commerce platform, at least one transaction corresponding to the at least one first sale item and the at least one second sale item, based on one or more of the at least one first purchase detail, the at least one second purchase detail, and the at least one payment detail 214 — Providing, via the first e-commerce platform and the at least one API, the at least one payment detail to the at least one first vendor 216 — Providing, via the middleware platform, the at least one payment detail from the first e-commerce platform to the at least one second e-commerce platform 218 — Retrieving, via the first e-commerce platform and the at least one API, at least one first transaction record corresponding to the at least one first sale item 220 — Retrieving, via the at least one middleware platform, at least one second transaction record corresponding to the at least one second sale item from the at least one second e-commerce platform 222 — Generating, via the first e-commerce platform, at least one invoice corresponding to the at least one transaction, the at least one invoice including one or more of the at least one first transaction record and the at least one second transaction record

FIG. 3B

SYSTEM AND METHOD FOR MANAGEMENT AND AUTOMATION OF INSTANT PURCHASE TRANSACTIONS

CROSS-REFERENCE TO RELATED APPLICATIONS

This present patent application is a continuation of U.S. patent application Ser. No. 15/076,259, filed on 21 Mar. 2016, which claims the benefit of U.S. Provisional Patent Applications Ser. No. 62/136,172, filed on 20 Mar. 2015, and Ser. No. 62/136,205, filed on 20 Mar. 2015. The entire content of each aforementioned patent filing is hereby incorporated by reference.

BACKGROUND

Current systems for web-based purchasing or mobile purchasing (e.g., via an internet-enabled smartphone or similar mobile device) incorporate an Application Programming Interface (API) to manage the exchange of information between a broad variety of client-side and merchant-side systems. APIs may be created by the parties involved in the transactions, and may to some extent be standardized, as within a network of participating vendors affiliated with each other and with a client-side platform. If, for example, the user of a mobile device wishes to purchase multiple items from multiple third-party vendors outside a vendor network, the simultaneous invocation of multiple diverse APIs by a mobile application may slow or disrupt other activity on the mobile device. It may therefore be desirable for a mobile purchase system to simultaneously manage multiple purchases, from participating and third-party vendors, in real time without disrupting the experience of the end user.

SUMMARY

Embodiments of the inventive concepts disclosed herein are directed to a system for completing instant online transactions involving the combined purchases of items from in-network and third-party retailers. In a first aspect, embodiments of the inventive concepts disclosed herein are directed to a system including a mobile device including a memory for securely storing payment details of the user of the mobile device. The system may include a client-side e-commerce platform executing on the mobile device and associated with a network of affiliated vendors. The client-side platform may acquire images captured by, or stored in, the mobile device, and identify candidate items for purchase based on the acquired images. The client-side platform may allow the user to select candidate items for purchase, whether the items are offered by affiliated vendors of the vendor network or by third-party retailers not affiliated with the vendor network. The client-side platform may retrieve purchase information (e.g., availability, inventory, shipping details, applicable taxes) for the in-network items by calling Application Program Interfaces (APIs) associated with the vendor network, and determine purchase information for items offered by third-party retailers by calling automated middleware to connect the client-side platform with merchant-side e-commerce platforms of the third-party vendors. The client-side platform may generate transactions corresponding to the combined purchase of in-network and third-party items based on the retrieved purchase information. The client-side platform may retrieve authorization codes and other transaction records associated with the completed purchase of the in-network items via the network APIs. The automated middleware may retrieve authorization codes and other transaction records associated with the completed purchase of the third-party items from the merchant-side platforms of the third-party vendors, and forward the retrieved purchase records to the client-side platform.

In a further aspect, embodiments of the inventive concepts disclosed herein are directed to a related method for completing instant online transactions involving the combined purchases of items from in-network and third-party retailers based on images of desired products or items. The method may include acquiring an image via a client-side e-commerce platform executing on a mobile device, the mobile device including a memory for storing payment details and security details associated with the user of the mobile device. The client-side platform may be associated with vendor networks of affiliated vendors. The method may include identifying candidate items based on the acquired images via the client-side platform. The method may include selecting items for purchase from the candidate items via the client-side platform, the items for purchase offered by affiliated vendors of the vendor network as well as third-party vendors not affiliated with the vendor network. The method may include retrieving, via the client-side platform, purchase information associated with items offered by the affiliated vendors by calling APIs associated with the vendor network or with affiliated vendors. The method may include retrieving, via the client-side platform, purchase information associated with items offered by third-party vendors by calling middleware platforms to connect the client-side platform with merchant-side e-commerce platforms of the third-party vendors. The method may include generating a transaction via the client-side platform, the transaction corresponding to the combined purchase of the selected in-network and third-party items, based on the retrieved purchase information and the user's payment details. The method may include providing the payment details of the user from the client-side platform to the in-network vendors via the vendor network APIs. The method may include providing the payment details of the user from the client-side platform to the merchant-side platforms via the middleware platforms. The method may include retrieving, via the client-side platform, authorization codes and other transaction records associated with the purchase of the in-network items via the network APIs. The method may include retrieving, via the middleware platforms, authorization codes and transaction records associated with the purchase of the third-party items and forwarding the retrieved records to the client-side platform. The method may include generating, via the client-side platform, a single invoice corresponding to the purchase of the in-network and third-party items based on the retrieved transaction records.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for managing and completing instant online transactions via a smartphone or similar mobile device. The transactions may involve the concurrent purchase of items from in-network, or affiliated, vendors as well as from third-party unaffiliated vendors. The user provides the system with an image of a desired item; based on attributes of the image, the system returns candidate items approximating the desired item. From the perspective of the mobile end user, the candidate items are presented in a consistent and uniform fashion, and may be purchased via single-click checkout without disrupting the end user's utilization of the mobile device regardless of the offering vendor (i.e., in-network or third-party). Upon checkout, the user may receive a single invoice for a single transaction incorporating multiple purchases from multiple vendors.

Figure 1:
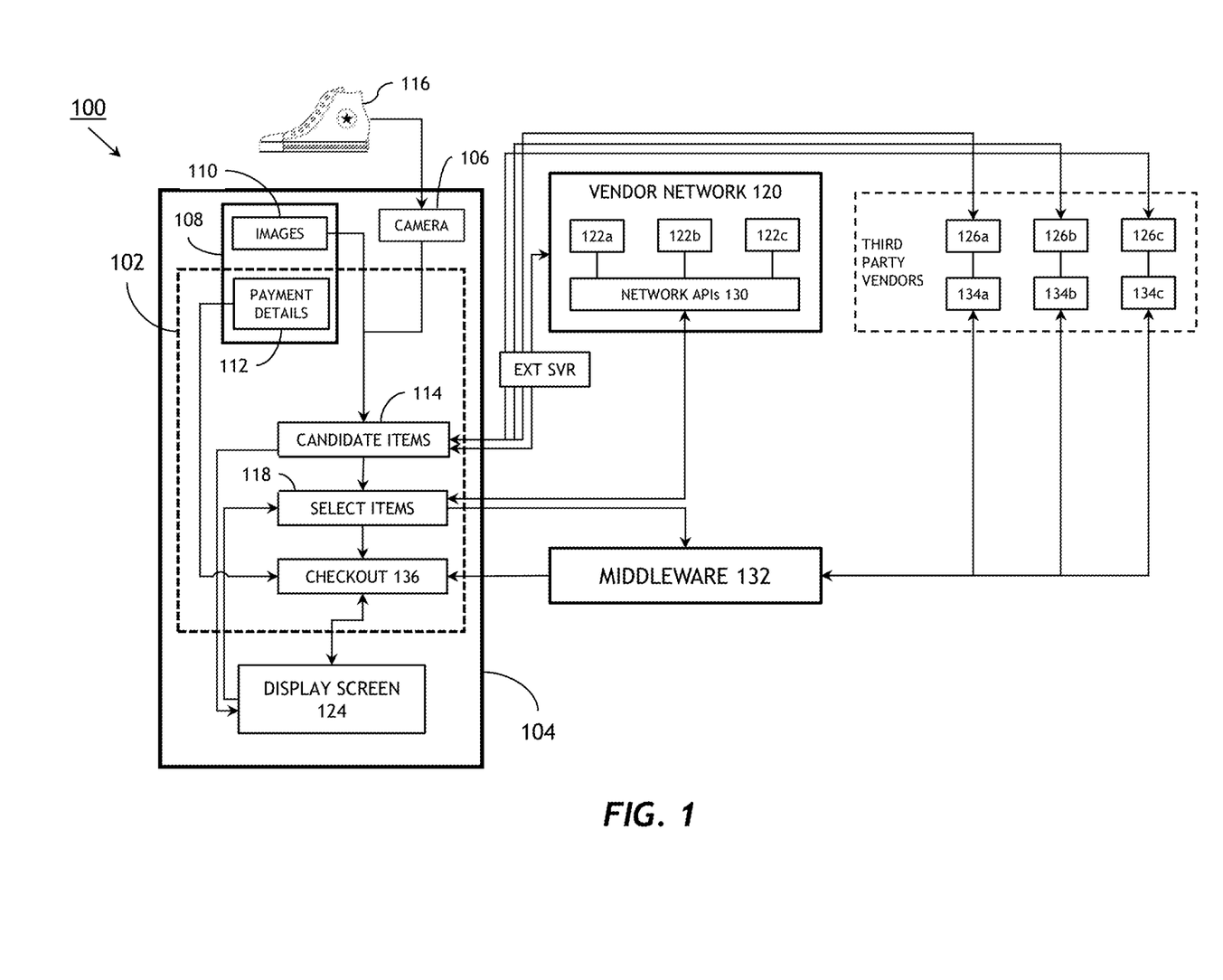
FIG. 1 is a block diagram of an exemplary embodiment of a system 100 according to the inventive concepts disclosed herein.

Referring to FIG. 1, a system 100 for completing instant online transactions may include a client-side e-commerce platform 102 configured to execute on one or more processors of a smartphone or similar mobile device 104. The mobile device 104 may include an onboard camera 106 and memory 108 which the client-side platform 102 may access and control, e.g., the end user may capture images via the onboard camera 106 from within the client-side platform 102. The memory 108 may store images 110 previously captured by the onboard camera 106 or otherwise stored to the mobile device 102 (e.g., downloaded by the end user) as well as payment details 112 entered by the end user via an initialization process when the client-side platform 102 is installed on the mobile device 104. For example, the client-side platform 102 may ask the end user for his/her name, shipping address, credit/debit card information, bank/payment service account information, and any other relevant information necessary for the client-side platform 102 to complete a transaction, securely storing the information to the memory 108. Payment details 112 stored in the memory 108 may include security details for verifying the identity of the end user, or if additional measures of security are desired. For example, the end user may store a password, pass phrase, personal identification number (PIN), or encryption key to memory 108. A security detail stored in the memory 108 may incorporate biometric data, such as a recorded fingerprint, eyeprint, or retinal scan.

The end user may activate the client-side platform 102 via the mobile device 104 when the end user wishes to purchase one or more desired items 116, e.g., articles of clothing or other consumer goods, such as a pair of white leather Converse high-top basketball shoes. The client-side platform 102 may search product catalogues and other online sources to identify candidate items (114) based on images captured by, or selected by, the end user via the client-side platform. For example, referring also to FIGS. 2A and 2B, the end user may photograph the desired item 116 through the client-side platform 102, which accesses the onboard camera 106 to capture the image 138. The end user may photograph a circular, advertisement, magazine, or other prefabricated image portraying the desired item 116. The end user may also select, via the client-side platform 102, a previously captured or downloaded image 138 from a photo library and stored to the memory 108 of the mobile device

Figure 2A:
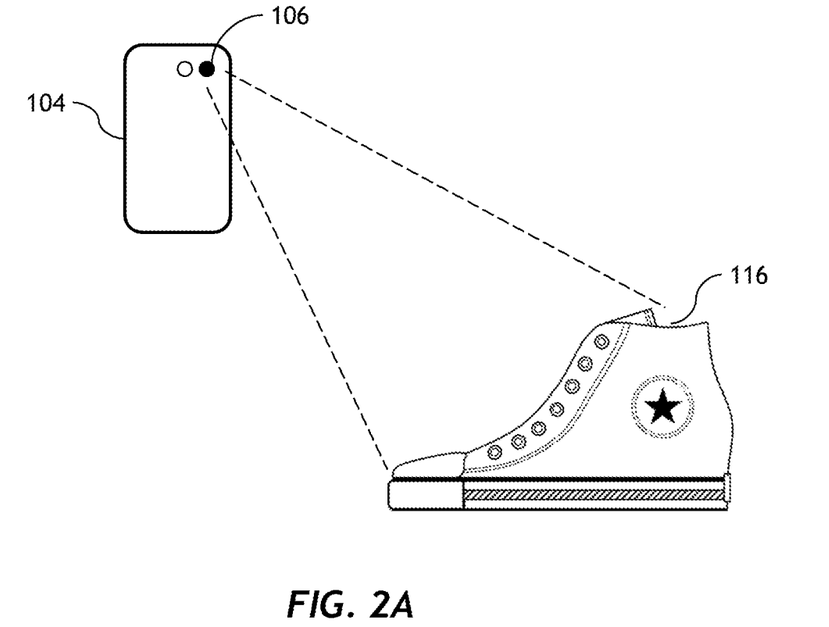
FIGS. 2A-2D illustrate operations of the system of FIG. 1 according to the inventive concepts disclosed herein.
Figure 2B:
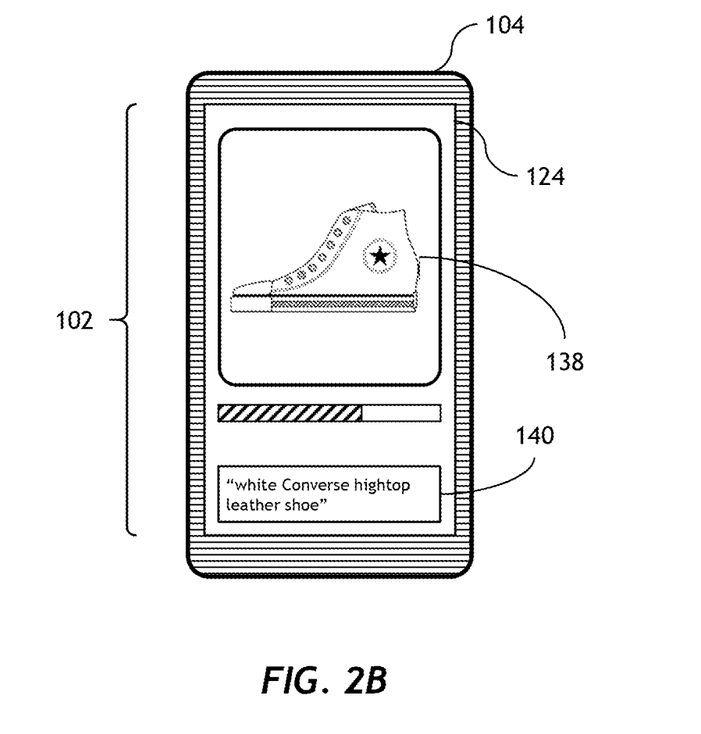

104. Based on an analysis of the captured image, the client-side platform 102 may determine attributes 140 of the desired item (e.g., attributes of an item of clothing may include color, material, gender, and other item categorizations such as shoes, belts, jackets, etc.). For example, the client-side platform may determine that the captured image 138 depicts a "white Converse hightop leather shoe". The quality of an image 138 submitted to the client-side platform 102a may determine the accuracy of the attributes 140 based on the image. For example, if a high quality image 138 is captured by the onboard camera 106, the client-side platform may determine with sufficient confidence that the desired item 116 is a 1) hightop basketball shoe; 2) a Converse-branded basketball shoe (or perhaps an even more specific make of shoe, e.g., Converse Chuck Taylor); 3) a white shoe, as opposed to gray, beige, or some other color; 4) a leather shoe, as opposed to a canvas shoe; and 5) a men's shoe, as opposed to a women's or unisex shoe. If the submitted image is of lower quality, e.g., a monochrome image or a low-resolution image, fewer attributes 140 may be determined with confidence; the client-side platform 102 may determine only that the desired item is a "white hightop shoe". The client-side platform 102 may reference knowledge bases stored on external servers or human assistance in identifying item attributes 140 from an image 138. The client-side platform 102 may determine image attributes 140 based on analysis of the image 138, e.g., colors, tints, hues, saturation and brightness levels, or pixel patterns, and identify candidate items 116 by attempting to identify catalogued or online images with similar properties to the captured image 138.

Figure 2C:
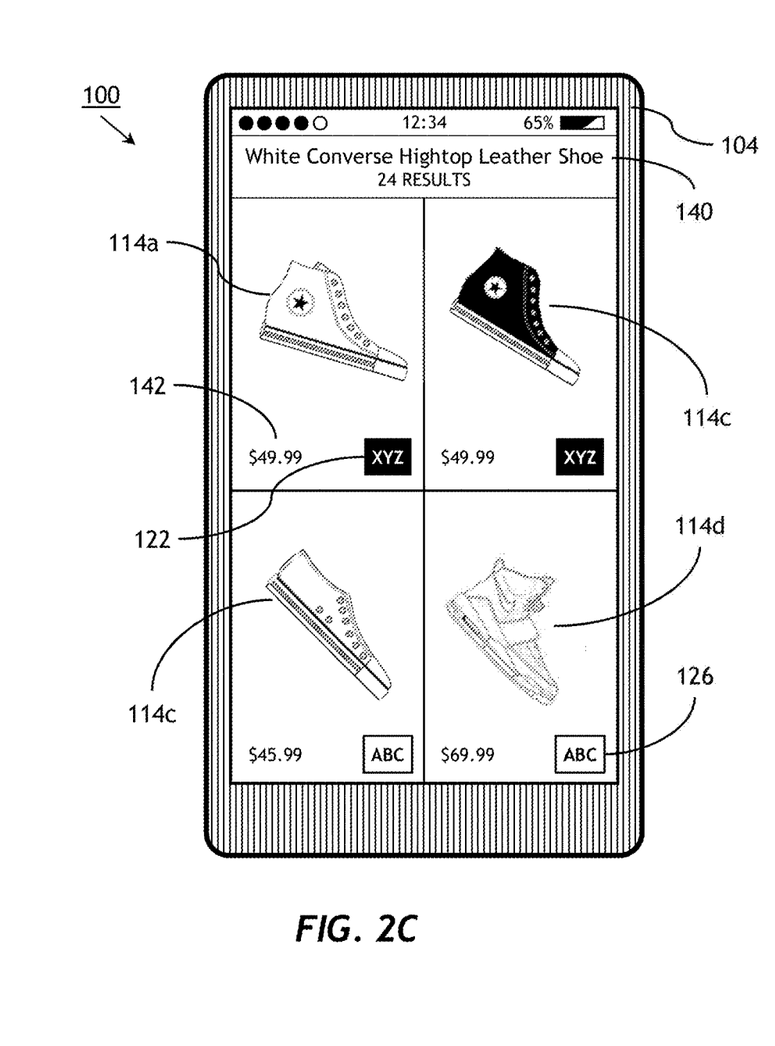

Once item attributes 140 based on a captured image 138 have been identified, the client-side platform 102 may search for candidate items 114 matching the determined item attributes 140 through a variety of online catalogues or product indices. If the client-side platform 102 is affiliated with a vendor network 120 of participating vendors 122a-c, the client-side platform may search catalogues organized by the vendor network 120 or by individual in-network vendors 122a-c. The client-side platform 102 may provide single-click access (e.g., through tapping a touch-sensitive display screen 124 of the mobile device 104) to additional product offers, coupons, or sales associated with the vendor network 120 or with individual in-network vendors 122a-c. The client-side platform 102 may order and display identified candidate items 114 based on the relevance or similarity of a candidate item to the desired item 116 or to the corresponding attributes 140 of the desired item. For example, referring particularly to FIG. 2C, the client-side platform 102 may return twenty-four candidate items 114 corresponding to the determined attributes 140 as shown in FIG. 2B ("white Converse hightop leather shoe") and display the candidate items on the display screen 124 of the mobile device 104. A candidate item 114a may be prominently displayed if the attributes of the candidate item match the attributes 140 of the desired item 116 exactly or nearly exactly. For example, the candidate item 114a may be a pair of white leather Converse hightop shoes and thus match exactly the desired attributes 140. The client-side platform 102 may retrieve and display catalogued information such as the price 142 of the candidate item 114a or the vendor 122 offering the candidate item (here, vendor XYZ is an in-network vendor 122 affiliated with a vendor network (120, FIG. 1) with which the client-side platform 102 is affiliated). A second candidate item 114b, also offered by the vendor XYZ (122), may be prominently displayed by the client-side platform 102 although the candidate item 114b may not as closely match the desired attributes 140 (e.g., candidate item 114b may be a pair of black canvas Converse hightop shoes). Similarly, candidate items 114c (a pair of white canvas lowtop shoes which may or may not be Converse-branded) and 114d (a pair of white leather Nike hightop shoes) may be less prominently displayed. The less relevant candidate items 114c and 114d may be offered by a third-party vendor ABC (126), which is not affiliated with the vendor network 120.

Figure 2D:
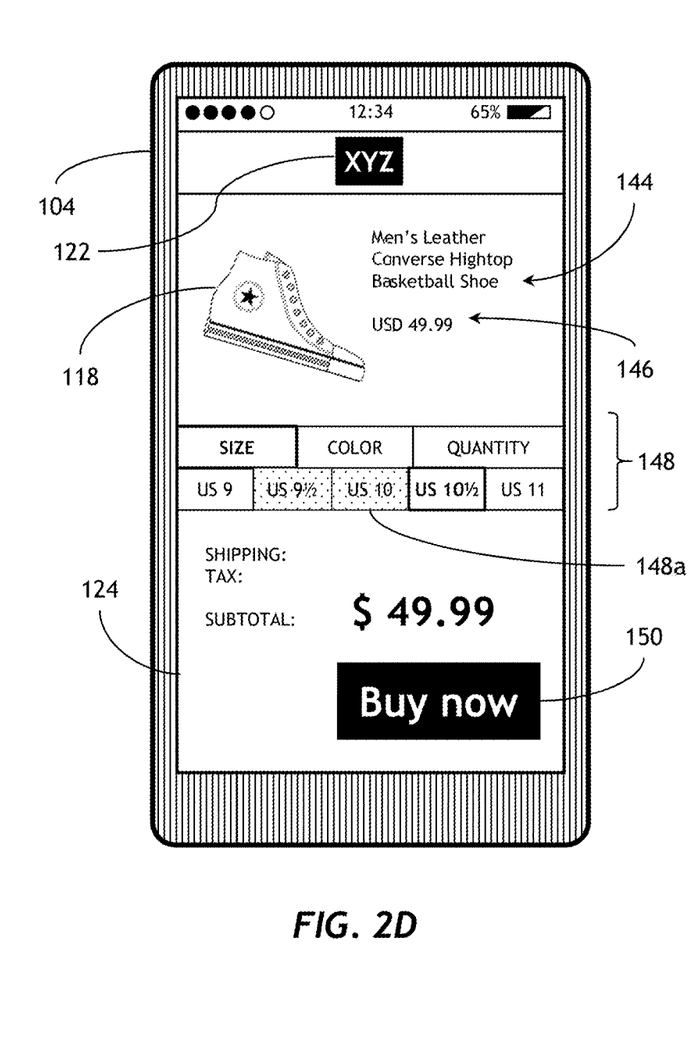

Referring also to FIG. 2D, the user may select one or more displayed candidate items 114a-d for purchase. For example, the user may click, tap, or otherwise contact the portion of the display screen 124 corresponding to the candidate item 114a, selecting that candidate item for purchase. If the selected item 118 is offered by an in-network vendor 122 (in this case, the in-network vendor XYZ), the client-side platform 102 may call network APIs 130 (FIG. 1) provided by the in-network vendor 122 (or by the vendor network 120 with which XYZ is affiliated) to retrieve current pricing and inventory information such as the item description 144 of the selected item 118 as well as the current price 146. The client-side platform 102 may call network APIs 130 to retrieve any shipping details or tax rates applicable to the purchase of the selected item 118, and allow the end user to select a desired size, color, quantity or other classification of the selected item 118 based on available inventory 148 determined by the network APIs 130 (e.g., one pair, US size 10½). The available inventory section 148 may indicate (148a) whether particular sizes, styles, or colors of a selected item 118 are out of stock or otherwise unavailable, e.g., US sizes 9½ and 10). Once the end user has finalized inventory details associated with the purchase of a selected item 118, the end user may add the selected item 118 to a transaction generated by the client-side platform 102, e.g., by clicking or tapping on a designated portion 150 (e.g., a button marked "buy now") of the display screen 124 of the mobile device 104. The end user may complete a generated transaction for the purchase of multiple selected items 118 via single-click checkout (136) or security challenge, depending on the desired level of security. For example, the client-side platform 102 may display a list of selected items 118 added to the transaction along with the price 146 of each item (including any applicable taxes and shipping costs); the end user may continue shopping, remove a selected item 118 from the transaction, or complete the transaction, purchasing the group of selected items 118, by tapping or clicking a designated "checkout" section of the display screen 124. The client-side platform 102 may (e.g., if the end user has previously requested such measures) require the end user to verify a security detail (securely stored with the end user's payment details 112 in the memory 108 of the mobile device 104) before completing a transaction. For example, the end user may be required to enter, confirm, or verify a password, pass phrase, PIN, encryption key, or a biometric detail such as a fingerprint or eyeprint.

Referring back to FIG. 1, once the end user has selected a pool of selected items 118 for purchase and checked out of the transaction, the client-side platform 102 may retrieve any information necessary for the purchase of each selected item 118. In the case of items to be purchased from in-network vendors 122a-c, the client-side platform 102 may call the network APIs 130, providing any required payment details 112 to the in-network vendors 112a-c so that the purchase of each individual selected item 118 of a transaction may be completed on the merchant side by the APIs. The client-side platform 102 may retrieve from the APIs 130 any shipping arrangements, applicable taxes, item availability details (e.g., in-stock colors, sizes, etc.) relevant to the purchase of selected items 118 from the in-network vendors 122*a-c*. With respect to selected items 118 offered by third-party vendors 126*a-c*, the client-side platform 102 may invoke an automated middleware platform 132 to connect the client-side platform to merchant-side e-commerce platforms 134*a-c* of the third-party vendors 126*a-c*. The middleware platform 132 may retrieve any current pricing, availability, shipping, and other purchase information necessary to finalize the purchase of selected items 118 from the third-party vendors 126*a-c*, providing the retrieved purchase information to the client-side platform 102.

When any necessary purchase information has been retrieved, the client-side platform 102 may prompt the end user to complete the transaction (i.e., checkout) by displaying to the end user a generated transaction (136) for the purchase of all available selected items 118, which transaction the end user may complete via interaction with the display screen 124 of the mobile device 104. For example, the client-side platform 102 may display a generated transaction 136 listing all selected items 118 to be purchased, the specific vendors from which each item will be purchased (including in-network vendors 122*a-c* and third-party vendors 126*a-c*), and the accurate and current sale price for each selected item 118; the end user may complete the transaction by clicking or tapping a specific portion of the screen, e.g., a prominently marked "buy now" button. When the end user completes the transaction, the client-side platform 102 may provide the relevant in-network vendors 122*a-c* with the end user's payment details 112, and retrieve any authorization codes, payment confirmations, or other records of the transaction, from the in-network vendors 122*a-c* via the network APIs 130. Similarly, the middleware platform 132 may retrieve user payment details 112 from the client-side platform 102 and forward any required payment details to the merchant-side platforms 134*a-c* of the relevant third-party vendors 126*a-c* so that any transactions for purchase of selected items 118 from the third-party vendors may be completed by the third party vendors. The middleware platform 132 may retrieve any resulting authorization codes, payment confirmations, tracking numbers, or other transaction records from the relevant merchant-side platforms 134*a-c* and forward the retrieved information to the client-side platform 102. The client-side platform 102 may generate for the end user an invoice of the transaction, which may be displayed via the display screen 124 of the mobile device 104; the generated invoice may include the retrieved authorization codes and other transaction records.

Figure 3A:
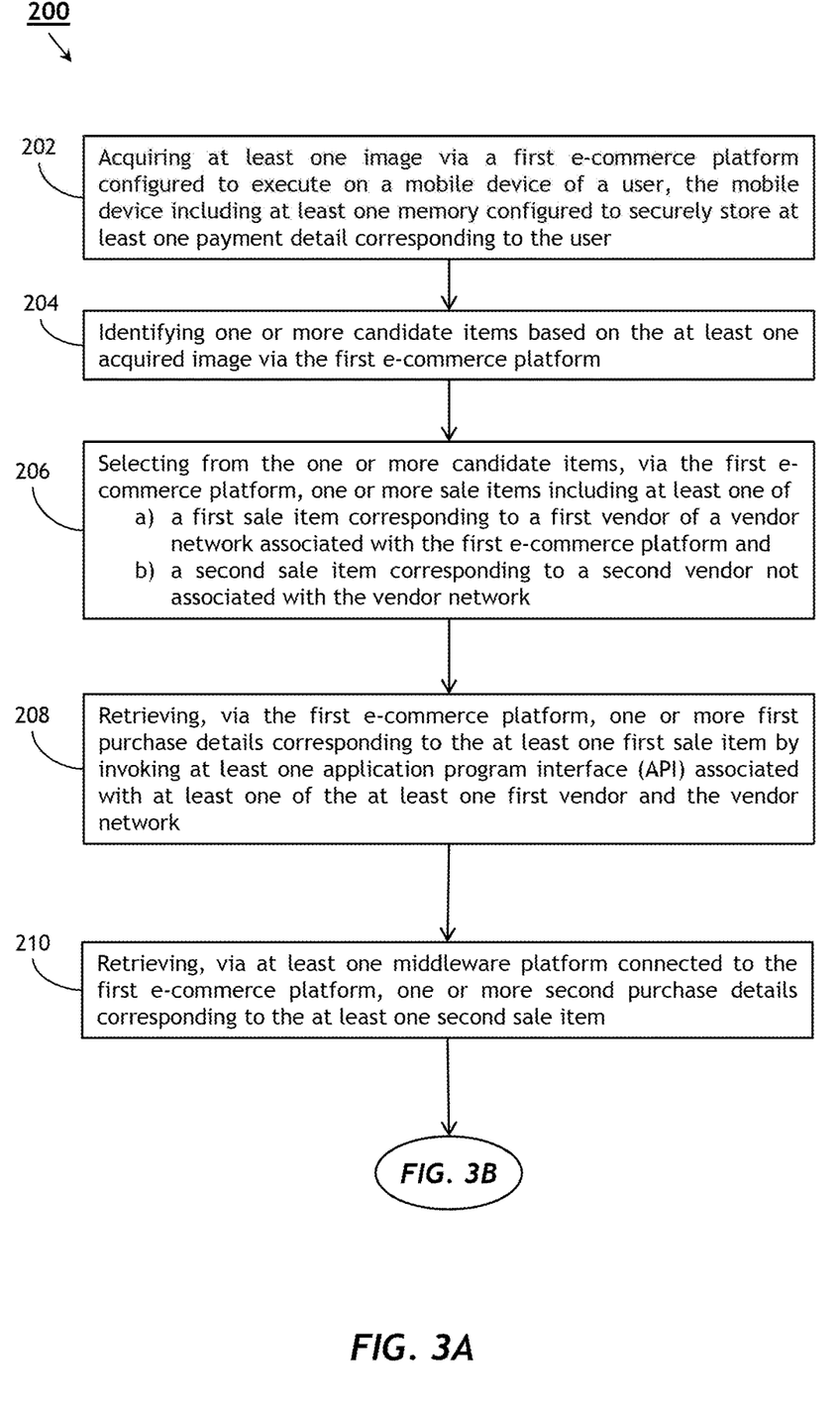
FIGS. 3A-3B are process flow diagrams illustrating a method according to the inventive concepts disclosed herein.
Figure 3B:
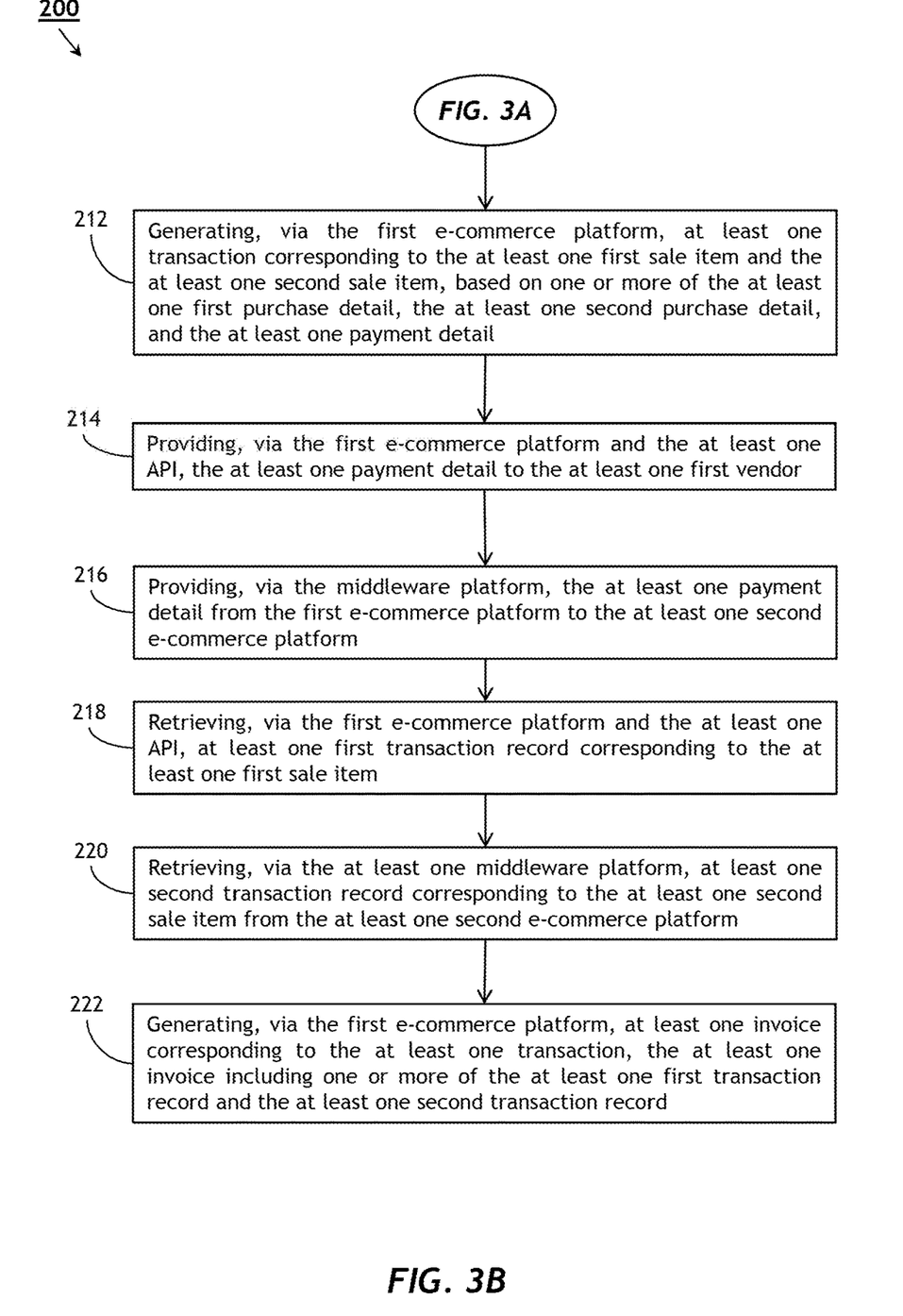

Referring to FIGS. 3A and 3B, an exemplary embodiment of a method 200 for completing instant online transactions with multiple vendors using a mobile device 104 may include the following steps. At a step 202, the client-side e-commerce platform 102 executable on the mobile device 104 acquires images related to a desired item 116. For example, the client-side platform 102 may acquire images via an onboard camera 106 of the mobile device 102. The client-side platform 102 may acquire images stored to a memory 108 of the mobile device 104.

At a step 204, the client-side platform 102 identifies one or more candidate items 114 (offered by in-network vendors 122*a-c* or third-party vendors 126*a-c*) based on the acquired images.

At a step 206, the client-side platform 102 selects items for purchase (selected items 118) from the candidate items 114, including items offered by in-network vendors 122*a-c* of a vendor network 120 associated with the client-side platform and items offered by third-party vendors 126*a-c*.

At a step 208, the client-side platform 102 retrieves purchase information (e.g., item descriptions, offering vendors, list prices) associated with the purchase of selected items 118 offered by in-network vendors 122*a-c* or a vendor network 120 by invoking Application Programming Interfaces (API) 130 associated with the vendor network or with the in-network vendors.

At a step 210, the client-side platform 102 retrieves purchase information associated with the purchase of selected items 118 offered by third-party vendors 126*a-c* by invoking middleware platforms 132 connecting the client-side platform 102 to merchant-side e-commerce platforms 134*a-c* of the third-party vendors. For example, the middleware platform 132 may retrieve the purchase information from the merchant-side platforms 134*a-c*, forwarding the retrieved information to the client-side platform 102.

Referring to FIG. 3B, at a step 212, the client-side platform 102 generates a transaction (checkout, 136) corresponding to the purchase of the selected items 118, based on the purchase information related to the purchase of selected items from in-network vendors 122*a-c*, the purchase information related to the purchase of selected items from third-party vendors 126*a-c*, and the payment details 112 of the end user. For example, the generated transaction may include an interaction of the end user with the mobile device 104 to complete the transaction (i.e., checkout process). The interaction may be a click, tap, or other contact by the end user on the touch-enabled display screen 124 of the mobile device 104 (e.g., on a designated "buy now" button displayed on the screen), or a verification by the end user of a security detail, such as a password, pass phrase, PIN, biometric detail, or other payment detail 112 securely stored in the memory 108 of the mobile device 104.

At a step 214, the client-side platform 102 provides the payment details 112 of the end user to the in-network vendors 122*a-c* via the network APIs 130 for execution of the completed transaction.

At a step 216, the middleware platforms 132 provide the payment details 112 of the end user from the client-side platform 102 to the third-party vendors 126*a-c*. For example, the middleware platforms 132 may provide user payment details 112 to the merchant-side platforms 134*a-c* of the third-party vendors 126*a-c*.

At a step 218, the client-side platform 102 retrieves authorization codes, purchase confirmations, and other transaction records related to the purchase of the selected items 118 from in-network vendors 122*a-c* via the network APIs 130.

At a step 220, the middleware platforms 132 retrieve authorization codes, purchase confirmations, and other transaction records related to the purchase of the selected items 118 from third-party vendors 126*a-c*. For example, the middleware platform 132 may retrieve the purchase records from the merchant-side platforms 134*a-c* of the third-party vendors 122*6a-c* and forward the retrieved purchase records to the client-side platform 102.

At a step 222, the client-side platform 102 generates an invoice of the completed and executed transaction 136, including the transaction records retrieved by the network APIs 130 from in-network vendors 122*a-c* and the transaction records retrieved by the middleware platform 132 from the merchant-side platforms 134*a-c* of the third-party vendors 126*a-c*.

As will be appreciated from the above, systems and methods according to embodiments of the inventive concepts disclosed herein may enable the online purchase via mobile device of multiple items based on images of the desired items in real time, without disrupting any mobile activity on the part of the end user. The end user need not have prior knowledge of where a desired product or item is sold locally, or even the details of its manufacture. The end user may locate and select items for purchase from both participating/in-network vendors as well as third-party vendors, viewing a single transaction completable by a single click and receiving a single invoice of the transaction regardless of the vendors from which each item is purchased.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. One or more tangible, non-transitory, computer-readable media storing instructions that when executed by one or more processors effectuate operations comprising:
obtaining, with a computer system, an image captured or selected responsive to an instruction of an end user;
determining, with the computer system, based on the image, with image recognition, a plurality of visual attributes of an object depicted in the image, the plurality of visual attributes including a color of the object, a type of the object, and a sub-type of the object;
selecting, with the computer system, a first subset of responsive candidate items and a second subset of responsive candidate items, wherein:
the first subset of responsive candidate items and the second subset of responsive candidate items are selected based on the plurality of visual attributes of the object and respective pluralities of visual attributes of candidate items,
the first subset of responsive candidate items is selected from a first set of items obtained from a first online product-listing of a first vendor;
the first set of items is obtained via a first set of application program interface (API) requests,
the second subset of responsive candidate items is selected from a second set of items obtained from a second online product-listing of a second vendor,
the second set of items is obtained via a second set of API requests, and
the second online product-listing is different from the first online product-listing; and
causing, with the computer system, a user interface including descriptions of the first subset of responsive candidate items and descriptions of the second subset of responsive candidate items to be presented.

2. The one or more media of claim 1, wherein:
the computer system comprises a mobile device;
obtaining the image comprises obtaining the image from the mobile device, wherein at least some of the plurality of visual attributes of the object are determined prior to a search of the first set of items and the second set of items being performed to select the first responsive set of candidate items and the second set of candidate items; and
the search includes an indication of the at least some of the plurality of visual attributes of the object as a search criterion.

3. The one or more media of claim 1, wherein:
obtaining the image comprises receiving the image from a mobile device; and
the descriptions of the first subset of responsive candidate items and the descriptions of the second subset of responsive candidate items are images of candidate items sent to the mobile device for presentation.

4. The one or more media of claim 1, wherein selecting the first subset of responsive candidate items and the second subset of responsive candidate items comprises steps for identifying catalogued or online images with similar properties to a captured image.

5. The one or more media of claim 1, wherein:
the first online product-listing comprises identifiers of images of items purchasable from the first vendor and submitted via the first set of API requests, each identified image being analyzed to determine attributes associated with a corresponding image's item and included in the first online product-listing for the first vendor; and
the second online product-listing comprises identifiers of images of items purchasable from the second vendor and submitted via the second API, each image being analyzed to determine attributes associated with the corresponding image's item and included in the second online product-listing for the second vendor.

6. The one or more media of claim 1, wherein at least some of the plurality of visual attributes of the object depicted in the image are determined by means for analyzing a captured image.

7. The one or more media of claim 1, wherein:
causing the user interface including the descriptions of the first subset of responsive candidate items and the descriptions of the second subset of responsive candidate items to be presented comprises:
matching the image depicting the object to images associated with the first subset of responsive candidate items from the first online product-listing; and
matching the image depicting the object to images associated with the second subset of responsive candidate items from the second online product-listing, wherein:
the first subset of responsive candidate items and the second subset of responsive candidate items are ranked from most relevant to least relevant with respect to the plurality of visual attributes in a ranked order,
the first subset of responsive candidate items and the second subset of responsive candidate items are presented in the ranked order.

8. The one or more media of claim 1, wherein selecting comprises:
determining candidate images from the first online product-listing and the second online product-listing to be discarded based on differences between the plurality of visual attributes of the object depicted in the image and the respective pluralities of visual attributes of the candidate items;

removing one or more of the candidate images to obtain a refined set of candidate images, wherein the one or more candidate images are removed by applying image recognition strategies to images of the candidate items in the first set and the second set;

determining, from the refined set of candidate images, matching visual attributes from metadata of each of at least some images of candidate items of the refined set.

9. A computer system having program code configured to effectuate operations comprising:

obtaining, with a computer system, a first product catalog of a first vendor, the first product catalog comprising a first plurality of items and associating respective items with respective images of the respective items;

obtaining, with the computer system, a second product catalog of a second vendor, the second product catalog comprising a second plurality of items and associating the respective items with respective images of the respective items;

extracting, with the computer system, visual attributes of items in the first product catalog and items in the second product catalog from the respective images with an image recognition tool implementing one or more visual recognition algorithms;

obtaining, with the computer system, a query image acquired with a mobile computing device, the query image depicting an object for which a search is to be performed among the first product catalog and the second product catalog;

extracting, with the computer system, visual attributes of the object from the query image using the image recognition tool implementing one or more visual recognition algorithms;

determining, with the computer system, based on comparisons of the visual attributes of the object with the visual attributes of the items in the first product catalog and the items in the second product catalog, how closely the object matches to items in the first product catalog and items in the second product catalog;

selecting a first subset of items from the first product catalog based on how closely the first subset of items are determined to match the object;

selecting a second subset of items from the second product catalog based on how closely the second subset of items are determined to match the object;

causing, with the computer system, based on selecting the first subset of items and selecting the second subset of items, the mobile computing device to display search results in a user interface, the search results depicting the selected first subset of items and the selected second subset of items, wherein:

the search results are user selectable in the user interface, and the user interface is configured to respond to user selection of a first item among the search results by causing the mobile computing device to interface with another computer system of a vendor of the first item to obtain additional information about the first item, the vendor of the first item being the first vendor or the second vendor depending on the user selection, wherein:

the vendor of the first item is the first vendor;
the first vendor is part of a vendor affiliate network including a plurality of vendors;

the user interface is configured to respond to the user selection of the first item by causing the mobile computing device to interface with a computer system of the first vendor via an application program interface (API) request of an API of the vendor affiliate network;

the computer system of the first vendor is the another computer system;

the API of the vendor affiliate network is supported by each of the plurality of vendors;

the second vendor is not part of the vendor affiliate network; and the user interface is configured to respond to user selection of a second item among the search results by causing the mobile computing device to interface with a computer system of the second vendor via another API that is different from the API of the vendor affiliate network.

10. The computer system of claim 9, wherein:
the another API is configured to cause a third-party computer system to place the mobile computing device in communication with the computer system of the second vendor to obtain purchase information associated with the second item.

11. The computer system of claim 9, wherein:
the another API request is configured to cause the mobile computing device to obtain purchase information of the first item from the computer system of the first vendor, the purchase information comprising available sizes and colors of the first item.

12. The computer system of claim 9, wherein:
the user interface is configured to respond to the user selection of the first item by presenting means for the user to select one or more displayed candidate items for purchase.

13. The computer system of claim 9, wherein:
the user interface is configured to respond to the user selection of the first item by causing the mobile computing device to interface with the another computer system to obtain and display available sizes and colors of the first item.

14. The computer system of claim 9, wherein:
the user interface presents a grid of images, each image in the grid depicting a different item in the search results, images in the grid being arranged based on how closely the object matches to the depicted item, the grid providing single-touch access to computer systems of individual vendors in a vendor network.

15. The computer system of claim 9, wherein the operations comprise:
obtaining the respective images of the respective items in the first product catalog from online sources,
wherein:
the computer system comprises the mobile computing device and an external server, and
the mobile computing device has installed thereon an application configured to acquire the query image from a camera of the mobile computing device and interface with the external server to obtain the search results.

16. The computer system of claim 9, wherein:
the image recognition tool implements a plurality of visual recognition algorithms;
at least some of the visual recognition algorithms are configured to determine whether the object depicted in the query image conforms to established parameters associated with particular values in color, pattern, and shape.

17. The computer system of claim 9, wherein the operations comprise:
accounting for variation in lighting to match catalogued items to the query image, the accounting being performed by the image recognition tool.

18. The computer system of claim 9, wherein the operations comprise:
accounting for variation in visual angle to match catalogued items to the query image, the accounting being performed by the image recognition tool.

19. The computer system of claim 9, wherein:
selecting the first subset of items is based on both visual recognition analysis of the query image and determined textual attributes of the object based on the query image.

20. The computer system of claim 9, wherein:
extracting the visual attributes of items in the first product catalog comprises extracting textual attributes and other attributes;
selecting the first subset of items comprises:
in a first analysis, eliminating items in the first product catalog having images that do not correspond to the non-textual attributes; and
in a second analysis, eliminating items in the first product catalog with image recognition; and
the second analysis is performed after the first analysis on prospective matching items that are not eliminated in the first analysis.

21. The computer system of claim 9, wherein:
the extracted visual attributes of the object include color, material, gender, and other item categorizations.

22. The computer system of claim 9, wherein:
extracting the visual attributes of items in the first product catalog comprises steps for determining image attributes based on analysis of the query image.

23. The computer system of claim 9, wherein the operations further comprise:
interpolating a shape of a three-dimensional object from a plurality of two-dimensional images that vary in visual angle with respect to the three-dimensional object, wherein at least one of the first subset of items is selected based on the shape.

24. The computer system of claim 9, wherein the user interface orders and displays the search results based on both:
similarity of the search results to the object; and
similarity of the extracted visual attributes of the first subset of items and the second subset of items from the search results to the extracted attributes of the object from the query image.

25. The computer system of claim 9, wherein:
attributes upon which a given selection of an item from the first subset of items is based comprise color, material, texture, and design.

26. The computer system of claim 9, wherein the operations comprise:
steps for searching product catalogues and other online sources to identify candidate items.

27. The computer system of claim 9, wherein extracting visual attributes of the object and determining how closely the object matches to items in the first product catalog and items in the second product catalog comprise:
determining, with visual analysis, a collection of pixels of the object in the query image; and
after determining the collection of pixels, based on the collection of pixels, determining how closely the object matches to items in the first product catalog and items in the second product catalog.

28. The computer system of claim 9, wherein selecting the first subset of items from the first product catalog based on how closely the first subset of items are determined to match the object comprises:
determining how closely the first subset of items match the object with a vote matching system.

29. A method, comprising:
obtaining, with a computer system, a first product catalog of a first vendor, the first product catalog comprising a first plurality of items and associating respective items with respective images of the respective items;
obtaining, with the computer system, a second product catalog of a second vendor, the second product catalog comprising a second plurality of items and associating the respective items with respective images of the respective items;
extracting, with the computer system, visual attributes of items in the first product catalog and items in the second product catalog from the respective images with an image recognition tool implementing one or more visual recognition algorithms;
obtaining, with the computer system, a query image acquired with a mobile computing device, the query image depicting an object for which a search is to be performed among the first product catalog and the second product catalog;
extracting, with the computer system, visual attributes of the object from the query image using the image recognition tool implementing one or more visual recognition algorithms;
determining, with the computer system, based on comparisons of the visual attributes of the object with the visual attributes of the items in the first product catalog and the items in the second product catalog, how closely the object matches to items in the first product catalog and items in the second product catalog;
selecting a first subset of items from the first product catalog based on how closely the first subset of items are determined to match the object;
selecting a second subset of items from the second product catalog based on how closely the second subset of items are determined to match the object;
causing, with the computer system, based on selecting the first subset of items and selecting the second subset of items, the mobile computing device to display search results in a user interface, the search results depicting the selected first subset of items and the selected second subset of items, wherein:
the search results are user selectable in the user interface, and
the user interface is configured to respond to user selection of a first item among the search results by causing the mobile computing device to interface with another computer system of a vendor of the first item to obtain additional information about the first item, the vendor of the first item being the first vendor or the second vendor depending on the user selection, wherein:
the vendor of the first item is the first vendor;
the first vendor is part of a vendor affiliate network including a plurality of vendors;
the user interface is configured to respond to the user selection of the first item by causing the mobile computing device to interface with a computer system of the first vendor via an application program interface (API) request of an API of the vendor affiliate network;

the computer system of the first vendor is the another computer system;

the API of the vendor affiliate network is supported by each of the plurality of vendors;

the second vendor is not part of the vendor affiliate network; and the user interface is configured to respond to user selection of a second item among the search results by causing the mobile computing device to interface with a computer system of the second vendor via another API that is different from the API of the vendor affiliate network.

30. A method, comprising:

obtaining, with a computer system, an image captured or selected responsive to an instruction of an end user;

determining, with the computer system, based on the image, with image recognition, a plurality of visual attributes of an object depicted in the image, the plurality of visual attributes including a color of the object, a type of the object, and a sub-type of the object;

selecting, with the computer system, a first subset of responsive candidate items and a second subset of responsive candidate items, wherein:

the first subset of responsive candidate items and the second subset of responsive candidate items are selected based on the plurality of visual attributes of the object and respective pluralities of visual attributes of candidate items, the first subset of responsive candidate items is selected from a first set of items obtained from a first online product-listing of a first vendor;

the first set of items is obtained via a first set of application program interface (API) requests, the second subset of responsive candidate items is selected from a second set of items obtained from a second online product-listing of a second vendor, the second set of items is obtained via a second set of API requests, and the second online product-listing is different from the first online product-listing; and causing, with the computer system, a user interface including descriptions of the first subset of responsive candidate items and descriptions of the second subset of responsive candidate items to be presented.

* * * * *